US012537819B2

United States Patent
Genge et al.

(10) Patent No.: US 12,537,819 B2
(45) Date of Patent: Jan. 27, 2026

(54) DEVICE IDENTIFICATION AND DEDUPLICATION SYSTEMS AND METHODS

(71) Applicant: Bitdefender IPR Management Ltd., Nicosia (CY)

(72) Inventors: Bela Genge, Tirgu Mures (RO); Dan Macovei, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 191 days.

(21) Appl. No.: 18/480,125

(22) Filed: Oct. 3, 2023

(65) Prior Publication Data

US 2025/0112919 A1 Apr. 3, 2025

(51) Int. Cl.
*H04L 9/40* (2022.01)

(52) U.S. Cl.
CPC ........ *H04L 63/0876* (2013.01); *H04L 63/166* (2013.01)

(58) Field of Classification Search
CPC .... H04L 63/0876; H04L 63/166; H04L 67/00
See application file for complete search history.

(56) References Cited

U.S. PATENT DOCUMENTS

| 7,962,547 | B2 * | 6/2011 | Kern | ......................... | H04L 9/40 709/217 |
| 8,301,625 | B2 * | 10/2012 | Sugaya | ............... | H04L 12/2807 707/723 |
| 8,635,680 | B2 * | 1/2014 | Begorre | .............. | H04L 63/0876 713/170 |
| 9,003,488 | B2 * | 4/2015 | Spencer | ................ | H04L 67/303 713/168 |
| 9,787,502 | B2 * | 10/2017 | Han | ........................ | H04L 63/08 |
| 9,936,388 | B2 * | 4/2018 | Stan | .................... | H04L 43/0876 |

(Continued)

OTHER PUBLICATIONS

Perdisci et al., "IoTFinder: Efficient Large-Scale Identification of IoT Devices via Passive DNS Traffic Analysis," 2020 IEEE European Symposium on Security and Privacy (EuroS&P), Genoa, Italy, pp. 474-489, doi: 10.1109/EuroSP48549.2020.00037, Sep. 2020.

(Continued)

*Primary Examiner* — Jimmy H Tran
(74) *Attorney, Agent, or Firm* — Law of Andrei D Popovici, PC

(57) ABSTRACT

Some embodiments construct a device fingerprint of a target device (e.g., personal computer, smartphone) by intercepting an access request issued by the target device. A part of the device fingerprint may be determined according to the access request, e.g., according to various features of a TLS handshake, TCP header, and/or HTTP header of the respective access request. Another part of the device fingerprint is determined by transmitting a fingerprinting probe to the target device in response to the access request, and using executable code included in the fingerprinting probe to extract a set of features characterizing a browser executing on the target device. Some embodiments then compare the device fingerprint with reference fingerprints determined for other devices on the same network, to determine whether the target device is a familiar device or not. Exemplary applications include access control and personalized content distribution, among others.

19 Claims, 8 Drawing Sheets

(56) References Cited

U.S. PATENT DOCUMENTS

| | | | |
|---|---|---|---|
| 9,942,349 B2 | 4/2018 | Johannsen | |
| 10,644,949 B2* | 5/2020 | Cebere | H04L 41/0876 |
| 10,826,902 B1* | 11/2020 | Aksu | H04L 67/12 |
| 11,102,239 B1* | 8/2021 | Sareshwala | H04L 63/166 |
| 11,528,189 B1* | 12/2022 | Egri | H04L 41/12 |
| 2014/0164418 A1* | 6/2014 | Etchegoyen | G06F 21/316 |
| | | | 707/758 |
| 2015/0006384 A1* | 1/2015 | Shaikh | G06Q 20/382 |
| | | | 705/44 |
| 2015/0067472 A1* | 3/2015 | Chen | G06F 16/9577 |
| | | | 715/234 |
| 2015/0127825 A1* | 5/2015 | Johannsen | H04L 43/04 |
| | | | 709/224 |
| 2015/0237038 A1* | 8/2015 | Grajek | G06F 21/64 |
| | | | 726/8 |
| 2017/0169100 A1* | 6/2017 | Reshadi | G06F 21/54 |
| 2018/0083994 A1* | 3/2018 | Armstrong | H04L 63/1425 |
| 2018/0324265 A1* | 11/2018 | Macskassy | H04L 67/53 |
| 2019/0087495 A1* | 3/2019 | Salusky | H04L 63/1416 |
| 2019/0158503 A1* | 5/2019 | Bansal | H04L 63/0272 |
| 2019/0206001 A1* | 7/2019 | Ong | H04L 63/08 |
| 2019/0317647 A1* | 10/2019 | Thomas | G06F 3/0483 |
| 2020/0007585 A1* | 1/2020 | Williams | H04L 9/0891 |
| 2020/0028941 A1* | 1/2020 | Gurevich | G06F 16/9537 |
| 2020/0193315 A1* | 6/2020 | Sunkara | G06N 20/00 |
| 2020/0213206 A1* | 7/2020 | Bracken | H04L 43/026 |
| 2020/0258118 A1* | 8/2020 | Kovvali | H04L 43/026 |
| 2020/0322341 A1* | 10/2020 | Barouch | H04L 67/51 |
| 2021/0067455 A1* | 3/2021 | Lahtiranta | H04L 47/2483 |
| 2021/0152526 A1* | 5/2021 | Kohout | H04L 41/12 |
| 2021/0160275 A1* | 5/2021 | Anderson | H04L 63/1458 |
| 2021/0185137 A1* | 6/2021 | Fitzhugh | H04L 67/52 |
| 2021/0194894 A1* | 6/2021 | Anderson | H04L 63/1408 |
| 2021/0203521 A1* | 7/2021 | Konda | H04L 67/025 |
| 2021/0234860 A1* | 7/2021 | Bansal | H04W 12/37 |
| 2021/0258344 A1* | 8/2021 | Kula | H04L 67/54 |
| 2021/0385230 A1* | 12/2021 | Joshi | H04L 63/0236 |
| 2022/0078090 A1* | 3/2022 | Sinha | H04L 43/10 |
| 2022/0078208 A1* | 3/2022 | Anderson | G06N 7/01 |
| 2022/0124498 A1* | 4/2022 | Dymek | H04L 63/0876 |
| 2022/0167123 A1* | 5/2022 | Aguilera Bonet | |
| | | | G06F 18/23213 |
| 2022/0200950 A1* | 6/2022 | Sekar | H04W 12/06 |
| 2022/0343095 A1* | 10/2022 | Naqvi | H04L 63/102 |
| 2022/0360565 A1* | 11/2022 | Shribman | H04L 67/56 |
| 2022/0417099 A1* | 12/2022 | Yakovlev | H04L 41/0816 |
| 2023/0019306 A1* | 1/2023 | Povilavicius | H04L 63/20 |
| 2023/0146079 A1* | 5/2023 | Jeng | H04L 61/106 |
| | | | 726/26 |
| 2023/0156100 A1* | 5/2023 | Shribman | G06Q 40/08 |
| | | | 709/218 |
| 2023/0379405 A1* | 11/2023 | Chhabra | H04L 61/2528 |
| 2023/0394096 A1* | 12/2023 | Juravicius | G06F 16/951 |
| 2023/0403300 A1* | 12/2023 | Narayan | G06F 21/566 |
| 2024/0031408 A1* | 1/2024 | Bracken | H04L 63/166 |
| 2024/0265057 A1* | 8/2024 | Kol | G06F 16/958 |
| 2024/0283674 A1* | 8/2024 | Konda | H04L 12/2809 |
| 2024/0291744 A1* | 8/2024 | Chhabra | H04L 69/16 |
| 2024/0396914 A1* | 11/2024 | Althouse | H04L 63/166 |
| 2025/0148035 A1* | 5/2025 | Shribman | H04L 67/02 |
| 2025/0211618 A1* | 6/2025 | Anderson | G06N 3/09 |

OTHER PUBLICATIONS

Bremler-Barr et al., "IoT or NOT: Identifying IoT Devices in a Short Time Scale," NOMS 2020—2020 IEEE/IFIP Network Operations and Management Symposium, Budapest, Hungary, pp. 1-9, doi: 10.1109/NOMS47738.2020.9110451, Apr. 2020.

Meidan et al., "A novel approach for detecting vulnerable IoT devices connected behind a home NAT," Computers & Security, vol. 97:101968, https://doi.org/10.1016/j.cose.2020.101968, Oct. 2020.

Xu et al., "Characterizing DNS Behaviors of Internet of Things in Edge Networks," in IEEE Internet of Things Journal, vol. 7, No. 9, pp. 7991-7998, doi: 10.1109/JIOT.2020.2999327, Sep. 2020.

European Patent Office (EPO), International Search Report and Written Opinion mailed Jan. 3, 2025 for PCT International Application No. PCT/EP2024/077672, international filing date Oct. 2, 2024.

* cited by examiner

"ClientHello"

TCP header

HTTP header

DEVICE IDENTIFICATION AND DEDUPLICATION SYSTEMS AND METHODS

BACKGROUND OF THE INVENTION

The invention relates to computer security, and in particular to automatically identifying electronic devices for access control applications.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to extortion, loss of data and sensitive information, identity theft, and loss of productivity, among others. Malware may further display material that is considered by some users to be obscene, excessively violent, harassing, or otherwise objectionable. The explosive growth in mobile computing has only exacerbated exposure and the associated risks, with millions of devices such as smartphones and tablet computers constantly connected to the Internet and acting as potential targets for malware.

Security software may be used to detect malware infecting a user's computer system, and additionally to remove or block the execution of such malware. Security software may further prevent infection by preventing a protected device from accessing known sources of infection, such as Internet domains or specific webpages associated with fraud and/or distributing malware. Similarly, some corporate networks limit access to sensitive data to a restricted set of users and devices. Such security methods are generically known as access control and are typically implemented by network appliances such as routers and gateways, according to a user-specific or device-specific access policy.

However, correctly implementing access policies requires overcoming substantial technical challenges. First, the world of electronic devices is extremely heterogeneous and continuously changing. Applying the correct access policy may therefore require discerning among a vast array of device types and variants. Second, the device itself may change in time and behave in unfamiliar ways simply due to recurrent software updates and the installation of new software. A network device tasked with applying a personalized access control policy may therefore suddenly fail to recognize it. Furthermore, mobile computing devices such as smartphones and wearables are designed to accompany their owners and are therefore constantly hopping between networks. Implementing a unified access policy may therefore require identifying the respective device reliably across multiple networks and access points.

A robust implementation of access policies should also be insensitive to intentional malicious exploitations of network protocols. One such example is spoofing, wherein a rogue device masquerades as a legitimate one to surreptitiously gain access to specific resources or network locations. Another example comprises media access control (MAC) address randomization, wherein the same device may expose distinct MAC addresses on different attempts to join a network, in order to ensure privacy, avoid tracking, etc.

The technical problems described above are not specific to computer security but apply equally to other applications that depend on a reliable identification of a user and/or device. Some such examples include parental control and targeted content delivery such as online advertising, among others.

In view of the above, there is an ongoing interest in developing robust and efficient methods of automatic device identification.

SUMMARY OF THE INVENTION

According to one aspect, a computer system comprises at least one hardware processor configured to, in response to receiving an access request from a client device, transmit a fingerprinting probe to the client device, the fingerprinting probe comprising computer code configured to determine a first set of feature values characterizing a browser executing on the client device. The at least one hardware processor is further configured to receive the first set of feature values from the client device, to determine a second set of feature values characterizing the client device according to metadata of the access request, and to determine a device fingerprint of the client device according to the first and second set of feature values. The at least one hardware processor is further configured to determine a similarity measure quantifying a similarity between the device fingerprint and a reference fingerprint characterizing a reference device, and in response, if the similarity measure indicates that the client device is the same as the reference device, set a device identifier of the client device to be equal to a device identifier of the reference device.

According to another aspect, a computer-implemented method comprises employing at least one hardware processor of a computer system to, in response to receiving an access request from a client device, transmit a fingerprinting probe to the client device, the fingerprinting probe comprising computer code configured to determine a first set of feature values characterizing a browser executing on the client device. The method further comprises receiving the first set of feature values from the client device, determining a second set of feature values characterizing the client device according to metadata of the access request, and determining a device fingerprint of the client device according to the first and second set of feature values. The method further comprises determining a similarity measure quantifying a similarity between the device fingerprint and a reference fingerprint characterizing a reference device, and in response, if the similarity measure indicates that the client device is the same as the reference device, setting a device identifier of the client device to be equal to a device identifier of the reference device.

According to another aspect, a non-transitory computer-readable medium stores instructions which, when executed by at least one hardware processor of a computer system, cause the computer system to, in response to receiving an access request from a client device, transmit a fingerprinting probe to the client device, the fingerprinting probe comprising computer code configured to determine a first set of feature values characterizing a browser executing on the client device. The instructions further cause the computer system to receive the first set of feature values from the client device, to determine a second set of feature values characterizing the client device according to metadata of the access request, and to determine a device fingerprint of the client device according to the first and second set of feature values. The instructions further cause the computer system to determine a similarity measure quantifying a similarity between the device fingerprint and a reference fingerprint characterizing a reference device, and in response, if the similarity measure indicates that the client device is the same as the reference device, set a device identifier of the client device to be equal to a device identifier of the reference device.

BRIEF DESCRIPTION OF DRAWINGS

The foregoing aspects and advantages of the present invention will become better understood upon reading the following detailed description and upon reference to the drawings where.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Metadata herein denote features of a transmission other than the payload itself. Exemplary metadata includes, among others, network addresses of the sender and/or receiver, a size of the payload, and a timestamp indicating a real time of the respective transmission. Two devices are said to be connected to or to belong to the same local network when their network addresses belong to the same subnet and/or when both have the same broadcast address. A local network is a network that has its communication hardware locally managed. A database herein denotes any organized, searchable collection of data. Computer-readable media encompass non-transitory media such as magnetic, optic, and semiconductor storage media (e.g., hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation. For example, although the disclosure below focuses on computer security embodiments, a skilled artisan will know that the described systems and methods may be adapted to other applications such as parental control and targeted content delivery, among others.

Figure 1:
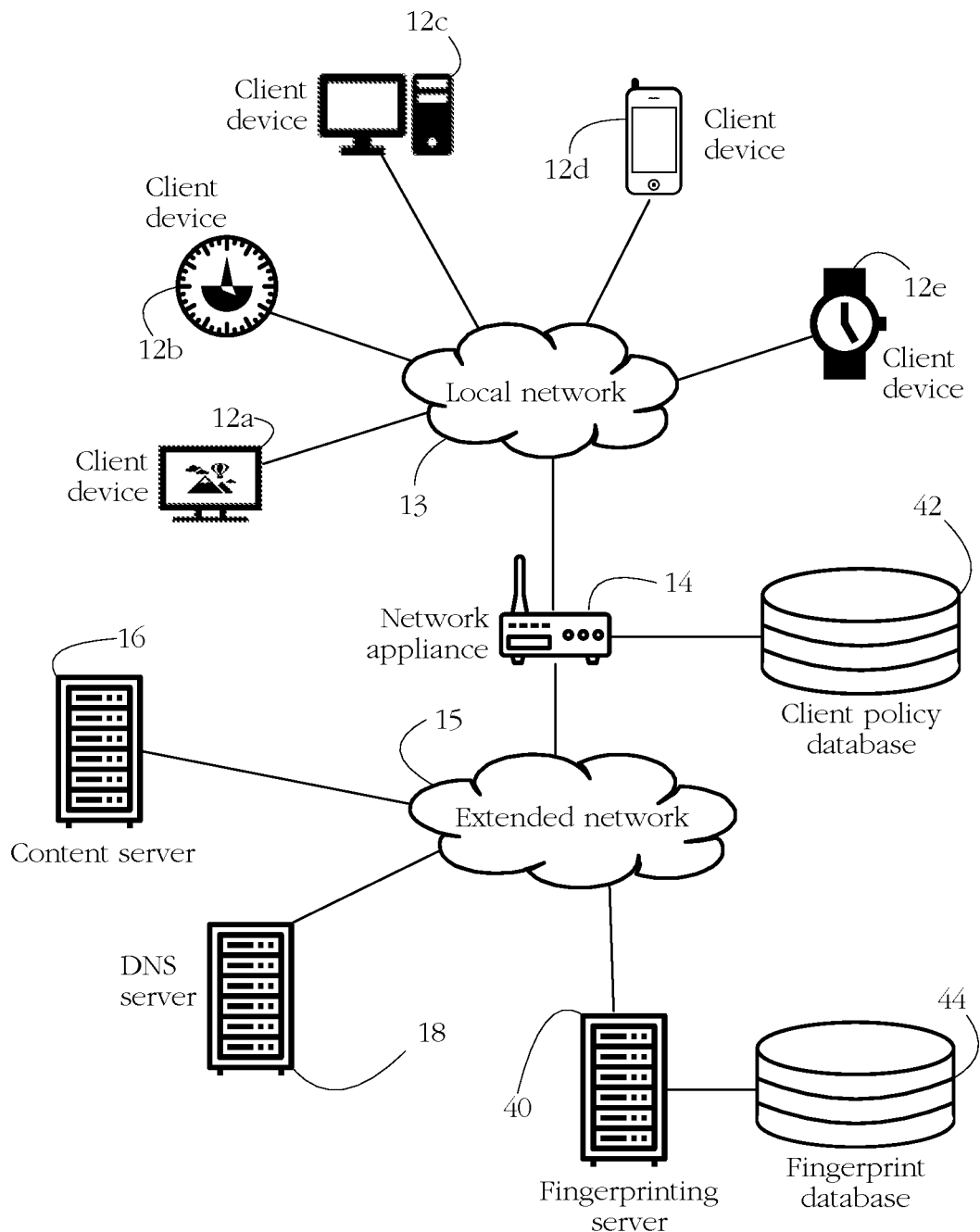
FIG. 1 shows a plurality of client devices protected from computer security threats according to some embodiments of the present invention.

FIG. 1 shows a plurality of client devices 12a-e interconnected by a local network 13 and further connected to an extended network 15, such as the Internet. Client devices 12a-e may represent any physical appliance having a processor, a memory, and a communication interface. Exemplary client devices 12a-e include personal computers, laptops, tablet computers, mobile telecommunication devices (e.g., smartphones), media players, TVs, game consoles, home appliances (e.g., refrigerators, thermostats, intelligent heating and/or lighting systems), and wearable devices (e.g., smartwatches, sports and fitness equipment), among others. Local network 13 may comprise a local area network (LAN). Exemplary local networks 13 may include a home network and a corporate network, among others.

Network appliance 14 comprises an electronic device enabling and/or controlling communication between client devices 12a-e and/or access of client devices 12a-e to extended network 15. For instance, appliance 14 may include a router and/or a network switch. In some embodiments, appliance 14 acts as a gateway between local network 13 and extended network 15, and provides a set of network services to client devices 12a-e. The term 'gateway' is used herein to denote a device configured so that at least a part of the communication traffic between client devices 12a-e and extended network 15 traverses the gateway device. Exemplary network services provided by appliance 14 include, for instance, distributing network configuration parameters (e.g., network addresses) to client devices 12a-e, for instance according to a dynamic host configuration protocol (DHCP). Other network services may include protecting clients 12a-e against computer security threats such as malicious software and intrusion, configuring private communication channels (e.g., virtual private networking-VPN), and selectively controlling access of clients 12a-e to specific remote resources and/or network locations (e.g., parental control, targeted advertising, etc.).

In some embodiments, network appliance 14 is further configured to carry out automatic device identification procedures, possibly in collaboration with a remote fingerprinting server 40 comprising an interconnected set of computer systems. Device identification herein comprises determining a device identifier of a respective device, the device identifier uniquely distinguishing the respective device from other physical devices. Stated otherwise, device identification as described below goes beyond determining a device type or category of the respective device (e.g., Samsung® Galaxy® S21 smartphone running Android® version 13) to actually identifying a single physical device.

In an exemplary use case scenario, appliance 14 keeps a record of client devices currently or previously connected to local network 13. Such records may be stored in a client policy database 42 communicatively coupled to network appliance 14. The data format of client device records may vary among embodiments, but in general, a client device record may associate a device identifier with an access policy applicable to the respective client device.

In some embodiments, a device identifier comprises a unique token (e.g., a hash) distinguishing the respective physical device from other physical devices 12a-e that may connect to local network 13. The device identifier may be computed according to a purposely devised algorithm/hashing scheme, or may comprise a popular identifier such as a Media Access Control (MAC) address or an International Mobile Equipment Identity (IMEI) number of the respective client device, among others. Some privacy-enhancing communication protocols use MAC address randomization, i.e., the same physical device may expose distinct MAC addresses on separate attempts to join local network 13. To address such situations, in some embodiments of the present invention the device identifier may include a plurality of MAC addresses, e.g., all MAC addresses that the respective device has exposed in previous attempts to join local network 13. Other exemplary device identifiers may include a set of device fingerprints determined for the respective device as described in detail below.

In some embodiments, a client device record of database 42 comprises an indicator of an access policy applicable to the respective device and/or to a user of the respective client device, the access policy indicative of a category of content that the respective device/user is allowed or is not allowed to access. Access policies may further specify a set of network locations (e.g., Internet domains, network addresses, etc.) that the respective device/user is allowed to access or is prohibited from accessing, an indicator of a time interval during which the respective device/user is allowed/prohibited from accessing a particular resource, etc. Each access policy may be further associated with a user account, subscription, and/or service agreement for providing a specific network service (e.g., security, parental control, etc.) to the respective client device and/or user.

In some embodiments, a device record further comprises a set of device characteristics $\{C_1, C_2, \ldots, C_n\}$ of the respective client device, which may include for instance a product category (e.g., personal computer, tablet computer, printer, smartwatch, home entertainment system, thermostat, etc.), a manufacturer (e.g., Samsung®, Nest®, Sonos® etc.), a hardware model (e.g., iPad® 2, MacBook® Air®, Galaxy® S6, etc.), and a version of an operating system executing on the respective device (e.g., Windows®, iOS® 8, Android® Marshmallow etc.).

In some embodiments, device identification comprises determining a device identifier of a target client device, in order to apply the appropriate network access policy. Such identification may comprise determining whether the target client device is the same as a familiar reference device, i.e., a device for which there exists at least one reference fingerprint against which to compare. The fingerprinting procedure is described in detail below. In some embodiments, database 42 stores records of all familiar, i.e., fingerprinted, devices. However, some characteristics of a client device (and therefore its device fingerprint) may change in time, for instance following a hardware and/or a software update. Due to such changes, a target device may wrongly be classified as unfamiliar, leading to an unwanted duplication of database device records. Some embodiments prevent such duplication by calculating a fingerprint similarity measure as described in detail below.

Device identification may occur in response to an attempt by a client device to join local network 13. In some such embodiments, network appliance 14 may only allow familiar devices to join the local network. Alternatively, appliance 14 may allow all devices to join the local network but perform a device identification procedure in response to an attempt by a client device to access extended network 15, e.g., the Internet. Appliance 14 may then enforce device-specific access policies according to a result of the device identification procedures.

Figure 2:
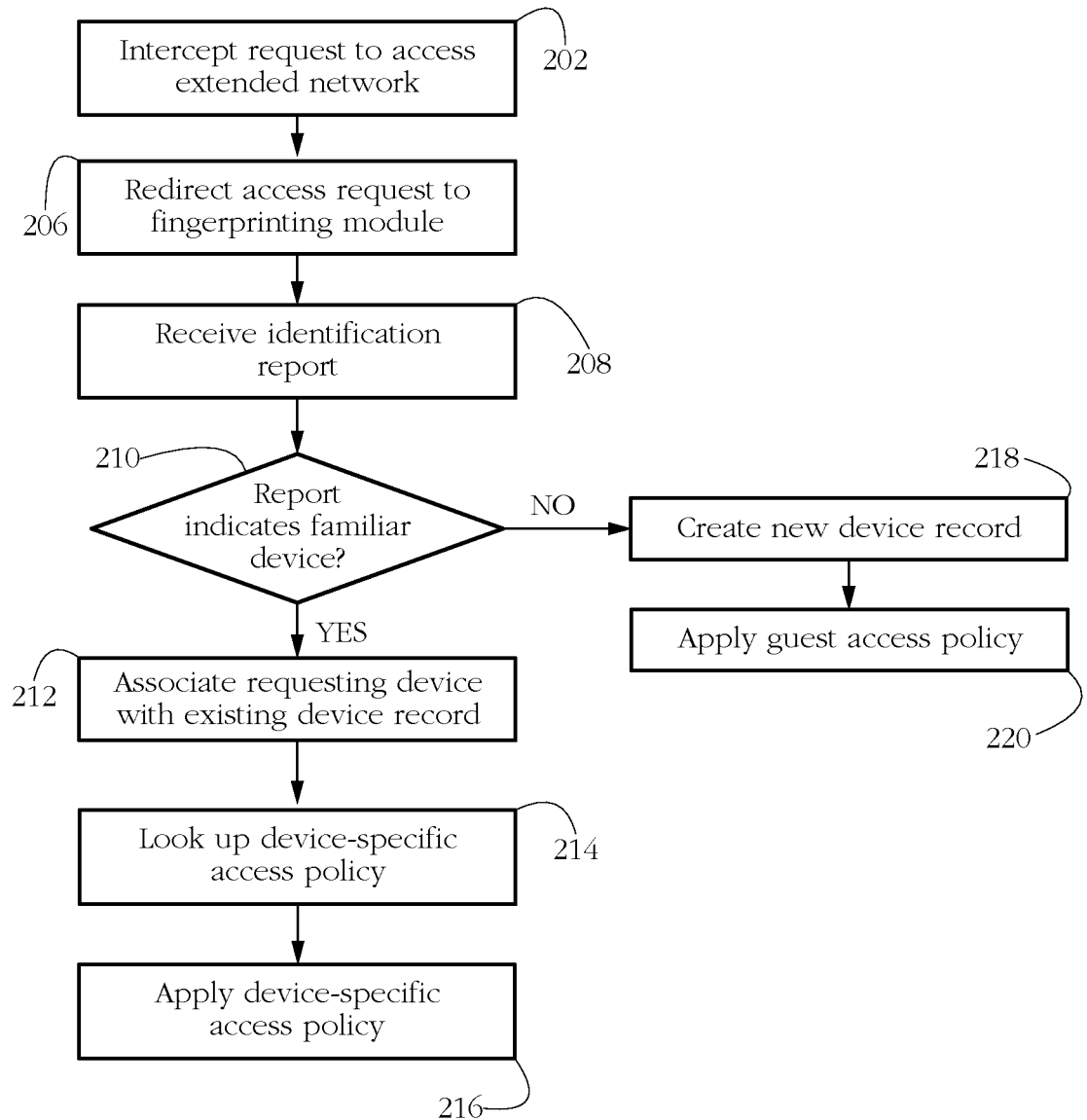
FIG. 2 illustrates an exemplary sequence of steps performed by a network appliance according to some embodiments of the present invention.

FIG. 2 shows an exemplary sequence of steps carried out by network appliance 14 according to some embodiments of the present invention. A step 202 comprises intercepting an attempt by a client device on local network 13 to access a resource located outside of the local network. For instance, step 202 may comprise detecting a hypertext transport protocol (HTTP) request issued by the respective client device, the HTTP request addressed at a remote content server 16 (FIG. 1), and suspending delivery of the respective request to its intended destination. Placing appliance 14 in a gateway position may facilitate interception and analysis of such traffic between client devices and a remote party.

In response to intercepting the access request, in a step 206 some embodiments may initiate a device fingerprinting procedure comprising redirecting the intercepted access request to a fingerprinting module/service and receiving a device identification report from the fingerprinting module/service (a step 208). The operation of the fingerprinting module/service will be described in more detail below.

When the identification report indicates that the device requesting access is a familiar device (a step 210 returns a YES), in a step 212 some embodiments will identify a device record within client policy database 42 and associate the source of the current access request with the respective device record. In embodiments as described below wherein the identification report includes a device identifier, step 212 may comprise identifying the device record according to the received device identifier. Step 212 may further comprise, for instance, adding a MAC address currently exposed by the respective device and/or a content of the identification report (e.g., the latest device fingerprint) to the respective device record.

In a sequence of steps 214-216 appliance 14 may identify and apply an access policy associated with the respective client device, i.e., forward the intercepted request to its intended destination or block the intercepted request, as per the respective access policy. To determine the applicable access policy, some embodiments may identify an account/service agreement associated with the respective client device and further identify the access policy according to the respective account/service agreement. Step 214 may comprise performing a set of database lookups according to a device identifier of the respective client device.

When the identification report received from the fingerprinting module indicates an unfamiliar device (step 210 returns a NO), some embodiments may create a new device record for the respective device and store the new device record in database 42 (a step 218). In embodiments wherein the identification report includes a device identifier, network appliance 14 may use the received device identifier when creating the new database record. Some embodiments may then proceed to configure an access policy associated with the respective device, for instance by returning a surrogate reply to the intercepted access request, the surrogate reply comprising a set of user interfaces enabling a user of the respective device to log in to an existing account, etc. Alternatively or additionally, in a step 220 some embodiments may apply a default access policy to the unfamiliar device. Exemplary default access policies include denying access to extended network 15 and enabling access to a limited set of resources and locations outside of local network 13.

Figure 3:
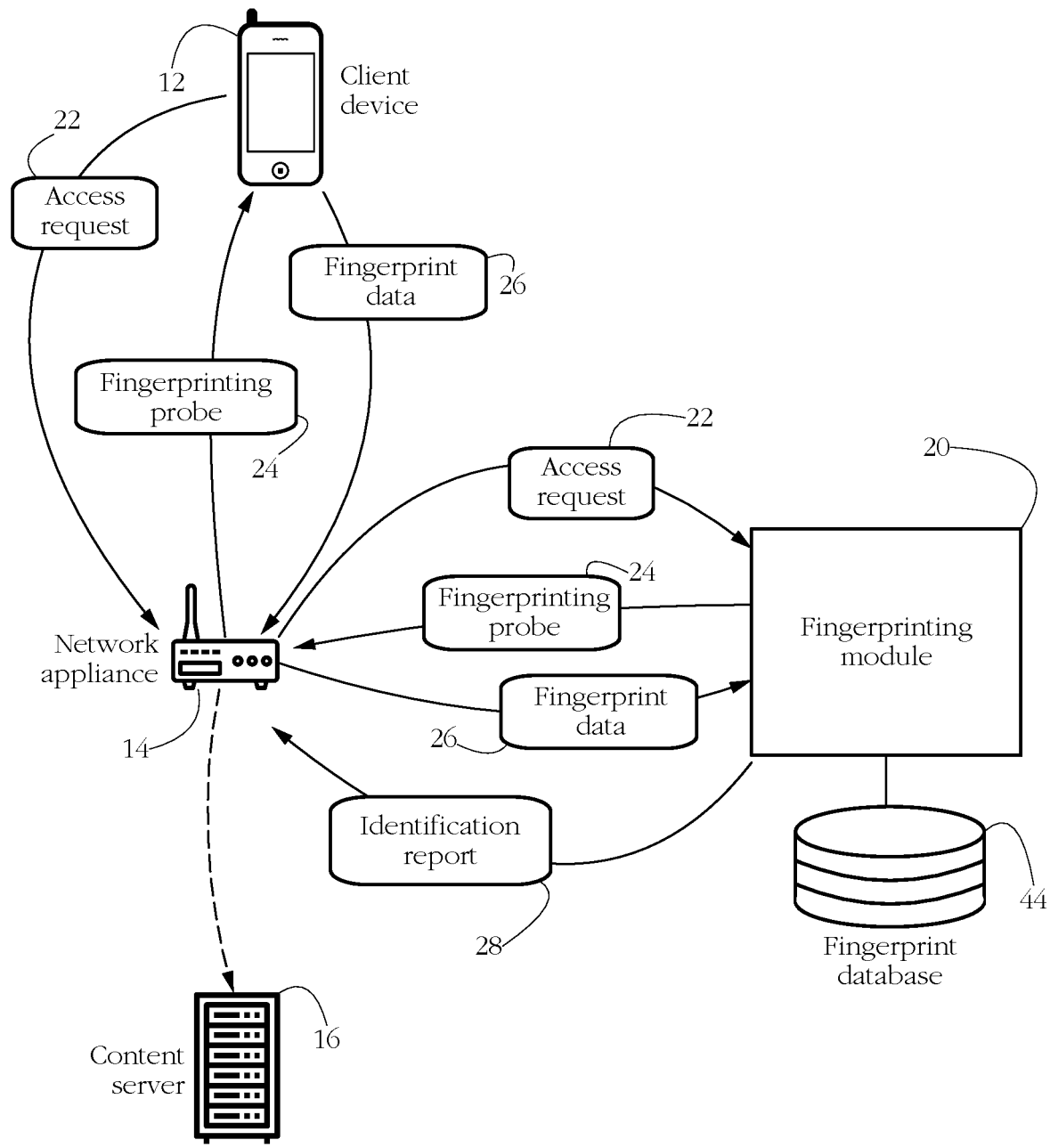
FIG. 3 shows an exemplary communication exchange according to some embodiments of the present invention.

FIG. 3 illustrates an exemplary data exchange between a client device 12, network appliance 14, and a fingerprinting module 20 during a fingerprinting procedure according to some embodiments of the present invention. Client device 12 generically represents any of client devices 12*a-e* in FIG. 1. Fingerprinting module 20 is configured to determine a device fingerprint distinguishing client device 12 from other clients 12*a-e*, the device fingerprint comprising a set of feature values characteristic for the respective device. In some embodiments, some components of the device fingerprint are determined by module 20 and/or network appliance 14 according to an access request formulated by the respective client device, while other components are determined according to a manner in which device 12 reacts to a fingerprinting probe, as described below.

Module 20 may be embodied for instance as a set of computer programs executed by a hardware processor of fingerprinting server 40 (FIG. 1), or alternatively, by a hardware processor of network appliance 14 or of another electronic device connected to local network 13. A skilled artisan will also know that in alternative embodiments, at least some of the functionality of module 20 may be implemented in dedicated hardware, such as an application-specific integrated circuit (ASIC) or field-programmable gate array (FPGA).

As described above, network appliance 14 may be configured to intercept an access request 22 issued by client device. Access request 22 may comprise for instance an HTTP request to access a particular resource hosted by content server 16. To initiate a fingerprinting procedure, instead of forwarding request 22 to server 16, some embodiments of network appliance 14 redirect request 22 to fingerprinting module 20 (e.g., server 40 in FIG. 1). To redirect request 22, some embodiments of appliance 14 operate a domain name service (DNS) proxy configured to intercept a DNS query for resolving a domain name of server 16. Instead of returning a network address of server 16, the DNS proxy may return a surrogate address pointing to a location of fingerprinting module 20 (e.g., server 40), thus effectively redirecting subsequent HTTP requests from client 16 to module 20.

Figure 4:
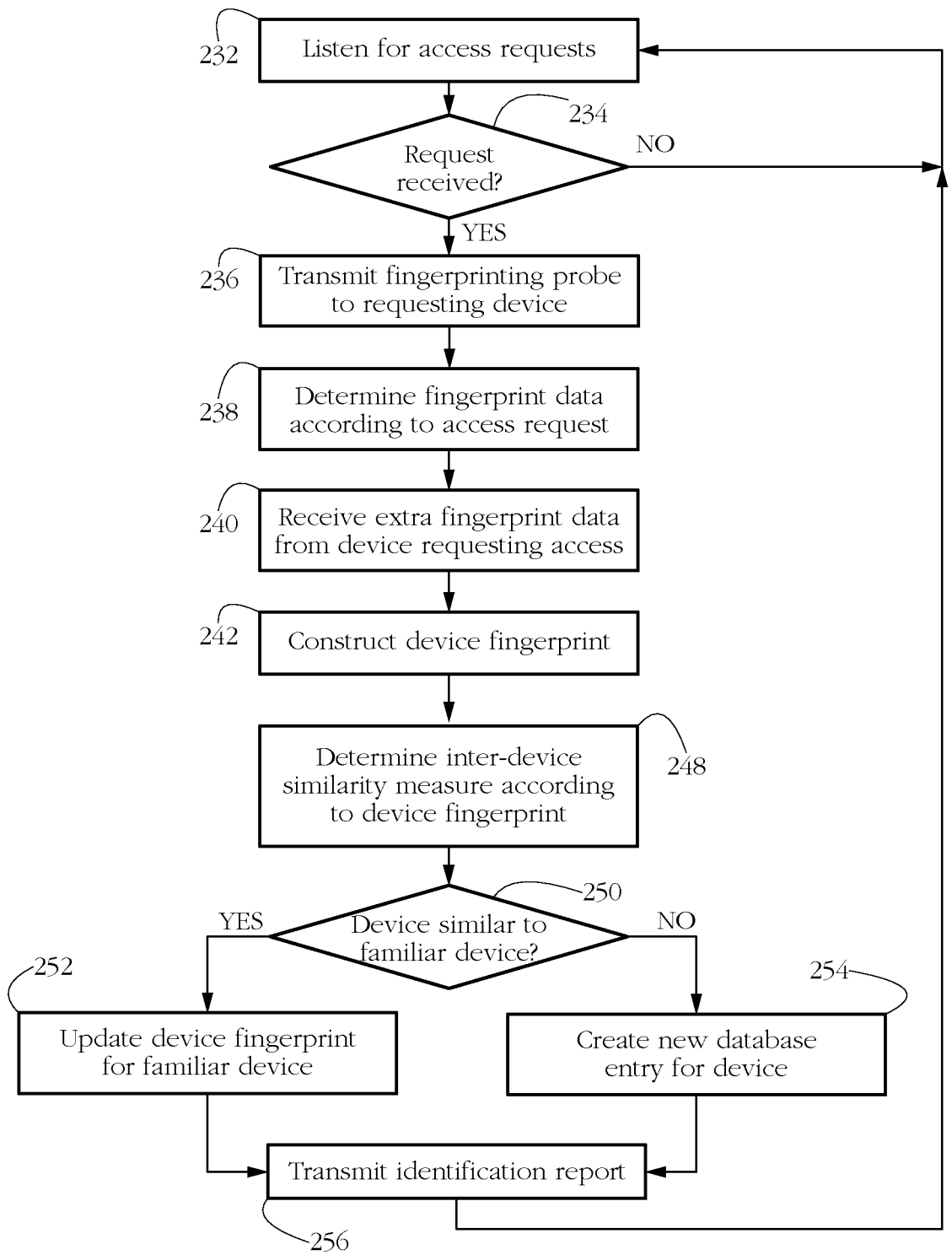
FIG. 4 shows an exemplary sequence of steps carried out by a fingerprinting module according to some embodiments of the present invention.

FIG. 4 shows an exemplary sequence of steps performed by fingerprinting module 20 according to some embodiments of the present invention. A sequence of steps 232-234 listens for access requests from clients. In response to receiving access request 22, in a step 236 some embodiments generate a surrogate reply to access request 22 in the form of a fingerprinting probe 24 and transmit probe 24 to client device 12. Fingerprint probe 24 may include a set of data formatted to be interpreted by a web browser executing on client device 12, for instance a specification of a document formulated in a version of a hypertext markup language (HTML) or extensible markup language (XML). In some embodiments, fingerprint probe 24 further includes executable code (i.e., a computer program) configured to be executed by the client's web browser and further configured to determine a set of device features characterizing client device 12, as further detailed below. Exemplary executable code included in probe 24 comprises code formulated in a scripting language such as a version of JavaScript®, among others.

Figure 5:
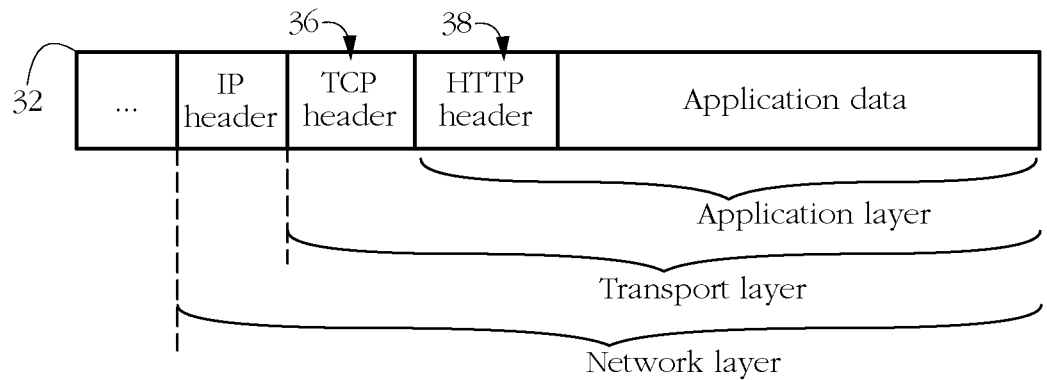
FIG. 5 illustrates the make-up of an exemplary data packet transmitted over a communication network.

In a step 238, module 20 may determine a set of device features characterizing client device 12 according to request 22. Such features may form a part of a device fingerprint as further detailed below. In most modern communication protocols, an electronic message such as access request 22 is typically broken into multiple parts, herein generically denoted as "packets", which may travel independently of each other. FIG. 5 illustrates an exemplary communication packet 32, comprising a payload (i.e., the content of the respective message, denoted as Application data in FIG. 5) and a set of headers including various communication metadata used for instance for routing and error checking, among others. Packet 32 may be intercepted and/or inspected at various levels of a networking protocol suite, wherein said levels herein refer to an open system interconnection (OSI) model. The type and content of packet headers may therefore depend on embodiment. When intercepted at an application level, an HTTP request may consist of a set of application data fronted by an HTTP header 38. However, at a transport level of the OSI hierarchy, the same packet may be further encapsulated with a transmission control protocol (TCP) header 36. Similarly, when intercepted at a network level, the packet may be further encapsulated with an internet protocol (IP) header, etc. Such headers are herein given merely as examples and may vary according to communication protocol and network architecture.

Figure 6:
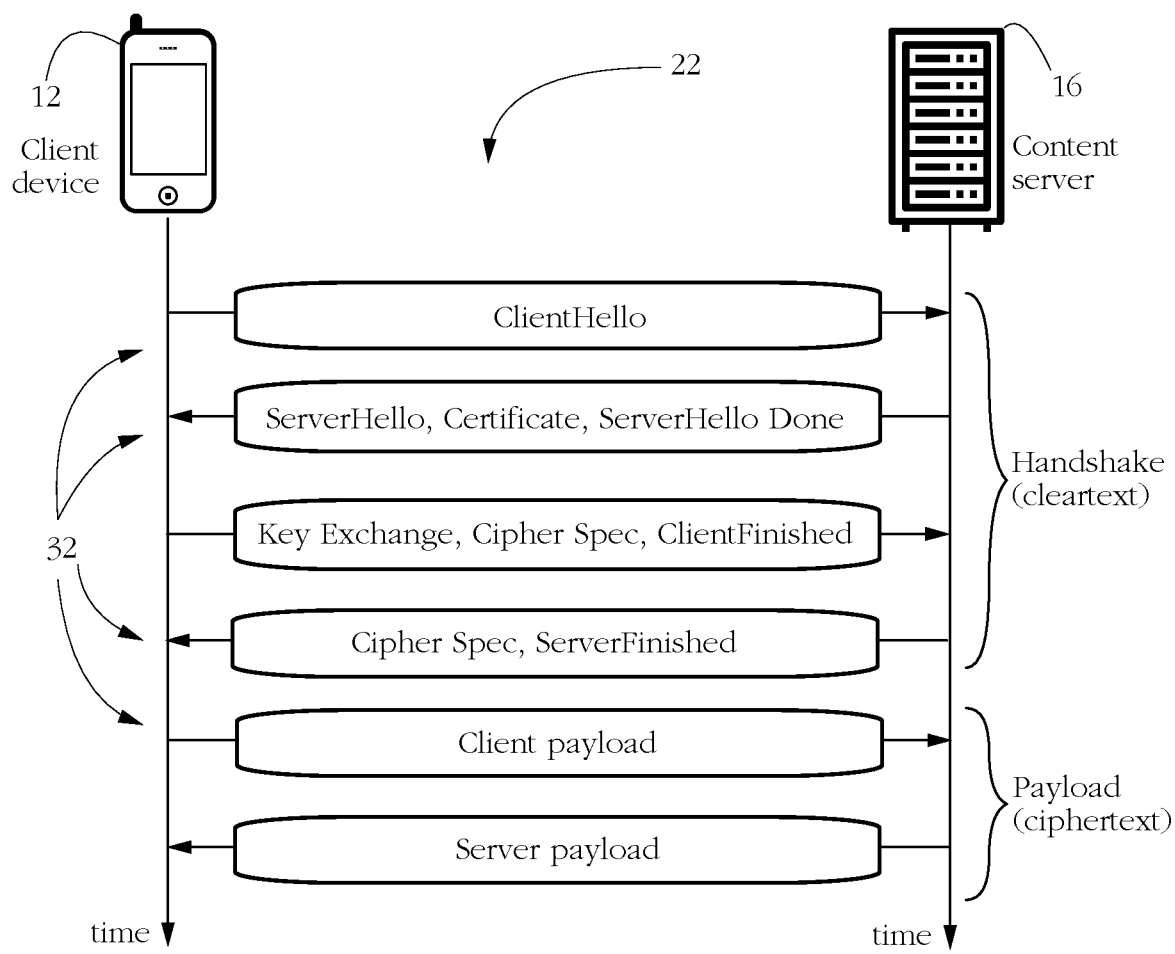
FIG. 6 shows an exemplary client-server exchange according to a version of a transport layer security (TLS) communication protocol.

Most modern browsers and other software relying on communicating with remote servers use encryption to prevent third parties from accessing a content of the respective communications. Encryption adds an extra layer of complexity to network communications and may further break access request 22 into multiple parts/packets, as illustrated for instance in FIG. 6, which shows a typical encrypted communication session carried out according to a version of the transport layer security (TLS) protocol which is used for instance to implement secure HTTP (HTTPS) requests. A skilled artisan will know that the use of TLS herein is only exemplary and not meant to be limiting.

As illustrated, transmitting access request 22 may actually comprise an exchange of multiple messages/packets 32, also known in the art as TLS records. Packets 32 may be grouped into a handshake part and a payload part. Handshake packets such as "ClientHello" are sent in preparation for transmittal of the payload, are typically formulated in cleartext (unencrypted), and comprise metadata such as various parameter values for establishing a connection between the respective communication parties, and various cryptographic parameter values required for encrypting and/or decrypting the payload. The handshake is typically followed by transmission of the payload encrypted according to parameter values determined and/or exchanged during the handshake.

Figure 7:
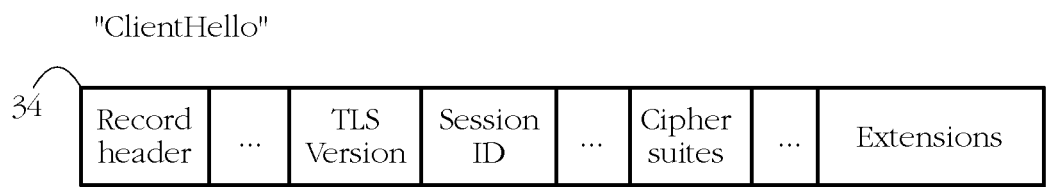
FIG. 7 shows exemplary contents of a TLS "ClientHello" message.

FIG. 7 illustrates exemplary application data of a "ClientHello" TLS record 34, comprising multiple metadata fields including a TLSVersion field, a CipherSuites field, and an Extensions field, among others. The TLSVersion field indicates which version of the TLS protocol is used in the current encrypted communication. The CipherSuites field lists a plurality of cipher suites (encryption algorithms) available for encrypting the current payload. The content of the Extensions field varies among protocols and implementations and is used for extending the functionality and/or various optimizations of TLS. The Extensions field may include multiple sub-fields. In some embodiments of the present invention, step 328 comprises fingerprinting module 20 identifying a "ClientHello" packet of access request 22 (for instance according to a content of a RecordHeader field) and extracting the following features, among others, from the respective "ClientHello" packet:

- a content of a TLSVersion field, e.g., '771' (corresponds to TLS version 1.2);
- a content of the CipherSuites field, e.g., {4865, 4866, 4867, 49196, 49195, 52393, 49200};
- a compliance indicator indicative of whether the respective packet complies with Generate Random Extensions And Sustain Extensibility (GREASE) requirements as defined in the Internet Engineering Task Force request for comments RFC8701, e.g., 'yes';
- a list of supported groups (specific subfield of the Extensions field), e.g., {29, 23, 24, 25};
- a list of Application-Layer Protocol Negotiation (ALPN) protocols supported by client device 12 (specific subfield of the Extensions field), e.g., {'h2', 'http/1.1'};
- a list of available certificate compression algorithms (specific subfield of the Extensions field), e.g., '1';
- a list of available signature algorithms (specific subfield of the Extensions field), e.g., {1027, 2052, 1025, 1283, 515, 2053, 2053, 1281};
- a list of available compression methods (specific subfield of the Extensions field), e.g., {0, 1};
- a list of supported TLS versions (specific subfield of the Extensions field), e.g., {769, 770, 771, 772}.

Some embodiments rely on the observation that since the contents of the Extensions field are not standardized, such data may vary among distinct hardware and software implementations of the communication stack, and may therefore be used to identify a device. Some embodiments therefore use some of the above features extracted from "ClientHello" TLS records as device fingerprint features, as further described below. Some embodiments further rely on the observation that list features, such as the list of available signature algorithms shown above, are ordered according to a preference of the originator of the respective "ClientHello" (i.e., client device 12). As confirmed by extensive experimentation with various device types, operating systems and browser types, such lists differ from one physical device to another not only in the contents, but also the order of the listed items. Some embodiments therefore use such lists as a whole (i.e., preserving the original order of items) as fingerprint features for device identification, as detailed below.

Figure 8:
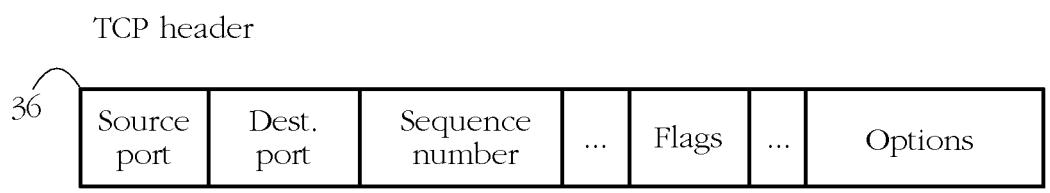
FIG. 8 shows exemplary contents of a transmission control protocol (TCP) header.

FIG. 8 illustrates an exemplary TCP header 36 as known in the art. Header 36 comprises a concatenation of multiple metadata fields, such as a Source Port, a Destination Port, a set of flags/control bits, and an Options field, among others. TCP header flags may be used to set a priority for the current data packet, to reset, or to finish a connection/session, for instance. A particular TCP header flag named SYN is used to mark a packet that initiates a TCP session, i.e., a first step in establishing a connection between the communicating parties. Some embodiments exclusively analyze data packets whose SYN flag is set. The content of the Options field varies among protocol versions and implementations and is used for extending the functionality and/or various optimizations of TCP. The Options field may include multiple sub-fields. In some embodiments, step 238 (FIG. 4) comprises fingerprinting module 20 identifying a packet having the SYN flag set, and extracting the following features, among others, from a TCP header of the respective packet:

- a list of option types indicating an order in which various subfields of the Option field are listed and a type of each individual option/subfield, e.g., {2, 1, 3, 1, 1, 8, 4, 0, 0};
- a content of specific flags appearing as subfields of the Options field, e.g., a content of an Explicit Congestion Notification Echo (ECE) and Congestion Window Reduced (CWR) flags;
- a maximum segment size (specific subfield of the Options field), e.g., 1460;
- a window scale (specific subfield of the Options field), e.g., 6.

Some embodiments again rely on the observation that since the contents of the Options field of the TCP header are not standardized, such data may vary among distinct hardware and software implementations of the communication stack, and may therefore be used to identify a device. Some embodiments therefore use some of the above features extracted from TCP headers as device fingerprint features, as further described below.

Figure 9:
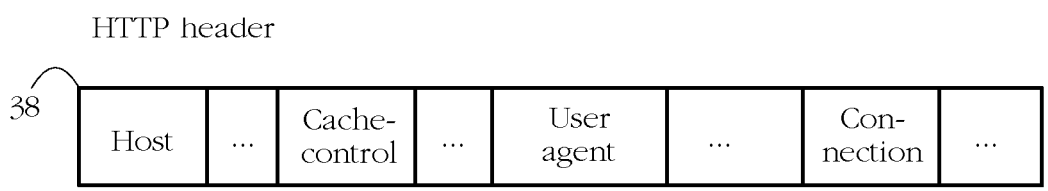
FIG. 9 shows exemplary contents of a hypertext transport protocol (HTTP) header.

FIG. 9 shows an exemplary content of HTTP header 38 as known in the art. Header 38 comprises a set of fields such as a Cache Control field and a User-Agent field, among others. The contents of some HTTP header fields specify various capabilities and/or preferences of the browser issuing the respective HTTP request, for instance what kind of documents it can display, what data compression methods it can handle, and how it handles cached data. An exemplary HTTP header is shown below:

Host: mywebserver.net
Sec-Fetch-Site: none
Connection: keep-alive
Sec-Fetch-Mode: navigate
Accept: text/html, application/xhtml+xml, application/xml; q=0.9,*/*; q=0.8
User-Agent: Mozilla/5.0 (iPhone; CPU iPhone OS 16_6 like Mac OS X) AppleWebKit/605.1.15 (KHTML, like Gecko) Mobile/15E148
Accept-Language: en-GB, en; q=0.9
Sec-Fetch-Dest: document
Accept-Encoding: gzip, deflate, br The format and content of HTTP header 38 is not standardized and depends on hardware specifications, on a type of operating system, as well as on a make and version of the web browser currently executing on device 12. For instance, the type of fields included in a HTTP request, as well as the order in which the respective fields appear in the HTTP header vary across devices, as revealed by extensive experimentation. Some embodiments rely on the observation that such variability may be used for device identification. However, some embodiments do not simply rely on the content of individual fields, but instead use the whole HTTP header as a fingerprint feature. For instance, in step 238 some embodiments compute a string feature comprising a concatenation of all fields of HTTP header 38, including field names and values in the order listed in the respective header. Beside individual field values, such a string further captures both the type and order of the header fields in one single fingerprint feature.

In response to receiving fingerprint probe 24 (FIG. 3), web browser software executing on client device 12 may interact with probe 24, for instance render a web page informing a user of the respective device that a fingerprinting procedure is ongoing. Executing the fingerprinting code included in probe 24 may then cause the respective web browser to determine a set of device fingerprint data 26 and to further transmit data 26 back to fingerprinting module 20. In a step 240 (FIG. 4) module 20 receives such data from device 12.

Figure 10:
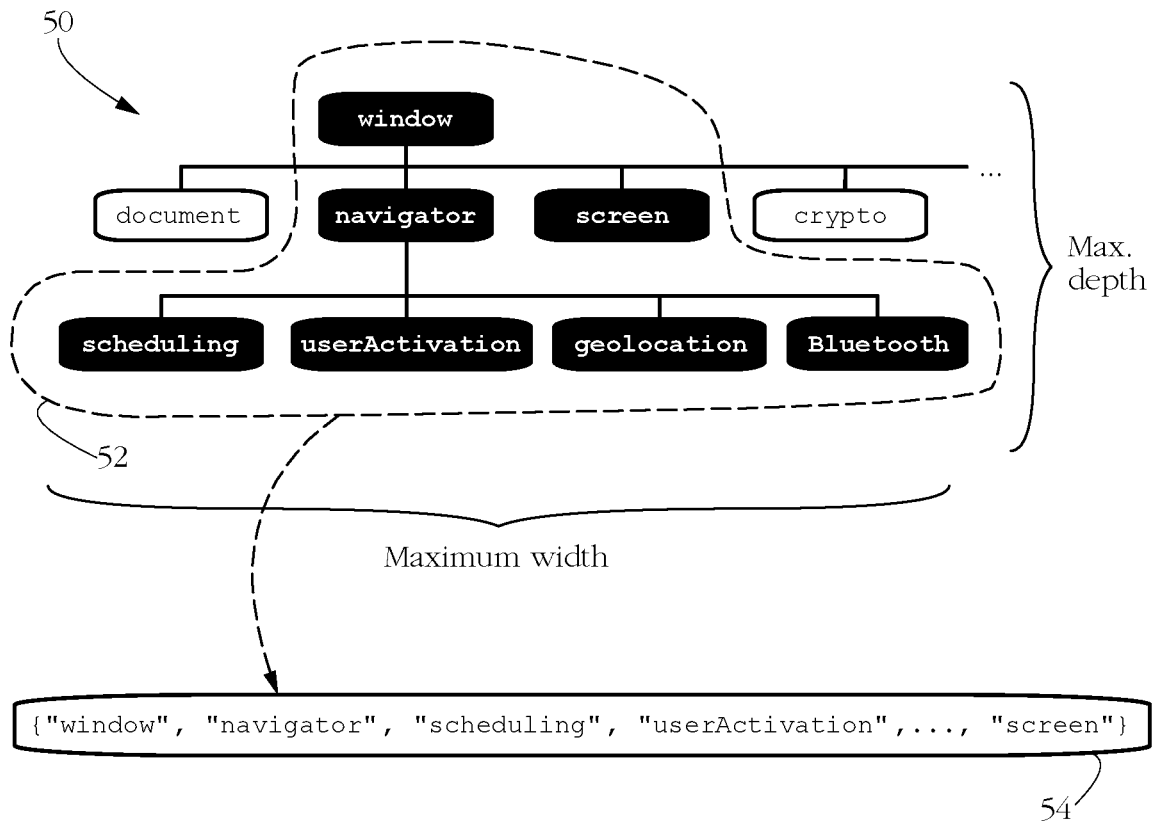
FIG. 10 illustrates an exemplary tree-like browser object model (BOM) and a selected BOM subtree according to some embodiments of the present invention.

Exemplary device fingerprint data extracted from the web browser may include various features of a browser object model (BOM). FIG. 10 illustrates a part of an exemplary BOM 50 according to some embodiments of the present invention. The BOM comprises a data structure specifying a hierarchy of software objects exposed by the browser. The multi-level tree-like data structure comprises a plurality of nodes, each node representing a distinct object or a distinct property of an object. Some nodes represent a content displayed by the browser, while others are related to various functional aspects of the browser (for instance, to how the browser handles encryption). For instance, a document node as illustrated may comprise a tree-like Document Object Model (DOM) specifying a content and appearance of a webpage currently displayed by the respective browser window. Some nodes of the BOM have children nodes, illustrated in FIG. 10 as nodes belonging to a lower level of the object hierarchy and connected to the respective parent nodes. Such children nodes represent object properties of the respective parent node, e.g., attributes of the parent or methods/functions acting on the parent. Some children nodes may themselves comprise complex software objects.

In some embodiments, fingerprinting code included in probe 24 is configured to construct at least a part of BOM 50 and to parse the respective BOM to extract various features characterizing the browser executing on client device 12. The BOM is not standardized, so its structure and content vary according to browser make and version, as revealed by computer experimentation. In one example, two smartphones run the same version of the Android® operating system, but distinct versions of the Chrome® browser. The BOM characterizing the newer version has a few extra nodes compared to the older version BOM, for instance new properties of the window.navigator node: navigator.Bluetooth, navigator.XRSystem, and navigator.SpeechSynthesis. Some embodiments therefore explicitly use the BOM for device fingerprinting.

Exemplary fingerprint features determined according to BOM 50 include property values of selected BOM nodes, and especially nodes encoding functional aspects of the browser. In particular, computer experiments revealed that properties of the window, navigator, and screen nodes of the BOM are effective at device identification. In contrast, property values of nodes such as navigation and history essentially encode the content displayed by the browser and are therefore not as reliable device identificators.

Another exemplary fingerprint feature comprises a text string determined according to a recursive traversal of a selected subtree of BOM 50. A subtree herein denotes a selected connected subset of nodes of BOM 50, as illustrated by subtree 52 in FIG. 10. The subtree may be selected according to a subtree root node (for instance all descendants of the navigator node, etc.). A subtree may be further selected to exclude specific nodes (e.g., a document node) and/or may be further limited in size, for instance up to a maximum tree depth and maximum tree width. As illustrated in FIG. 10, a tree depth may herein be defined as a number of levels of the BOM hierarchy, measured from the root of the respective subtree. Meanwhile, a tree width may represent a count of children nodes at each level of the subtree. Having a subtree limited to a maximum width may comprise, when the count of children nodes of a selected node exceeds the maximum width, excluding some of the respective children nodes from the respective subtree. In some embodiments, a recursive traversal of the selected subtree comprises an enumeration of all nodes of the selected subtree, listed in a pre-determined order, e.g., for each selected node, recite its children nodes before moving to another node located at the same level as the selected node. An exemplary BOM traversal feature 54 may comprise an ordered list of node names of selected subtree 52.

Other exemplary device feature extracted by code included in fingerprinting probe 24 comprise a set of fonts available to the browser, and a set of media codecs supported by the respective browser, among others. When such data is not included in BOM 50, some embodiments use fingerprinting code to determine available fonts by trial and error, e.g., by trying to format text using each of a pre-determined set of fonts and determining whether a respective font is available according to whether the formatting was successful. Similarly, fingerprinting probe 24 may include a mock media container configured to be accessed using a specific reference media codec. The fingerprinting code may then determine whether the browser supports the respective codec according to a manner in which the browser interprets the respective content, e.g., according to an error message produced by the browser when attempting to access the respective media file.

Yet another exemplary device feature extracted via fingerprinting code comprises an indicator of a date format used by the respective browser and or client device 12. In one such example, fingerprinting code included in probe 24 may instruct the browser to display a reference date and/or time, such as 12:29:04 on May 26, 1999, and record a result as a text string. The format in which the browser displays the date and time depends on the current location (time zone, local cultural preferences), as well as the preferences of a user of the respective device (e.g., between AM/PM and a 24h format, between using month names and numbers, etc.). Some embodiments therefore use date/time format indicators for device identification purposes.

Yet another exemplary device features extracted by fingerprinting code comprises an indicator of whether the respective browser integrates various third-party application programming interfaces (APIs). Examples of such APIs include online payment APIs such as Apple Pay® and W3C Payment Request APIs, among others. To detect whether the browser supports the respective libraries, some embodiments of fingerprinting probe 24 include a call to a selected function of the respective API, and determine a device feature according to a result of attempting the respective function call.

Other exemplary APIs include Web credential management APIs configured to handle user credentials such as passwords, among others. Some embodiments of fingerprinting probe 24 include a call to an API function, for instance an attempt to create a set of mock credentials using a valid reference set of user parameter values (username, public key, etc.). The fingerprinting code may then determine a device feature comprising a text string determined according to a result of the attempt. In one such example, an empty string may indicate success (i.e., the respective API is supported), while a non-empty string including the content of an error message may indicate that the respective API is not supported. Computer experiments have shown that the content of such error messages varies among device makes, models, and OS versions, as well as among browser makes and versions, and therefore may be used for device identification.

In yet another example of a feature determined by fingerprinting code executing within the browser, probe 24 may be configured to deliberately cause an error and collect an error message generated by the browser in response to the respective error. For instance, probe 24 may include a badly formatted API call, or an API call with invalid parameter values (e.g., out of range, mismatched, etc.). In one exemplary experiment using a Web credential management API, an attempt to create a set of credentials using an invalid algorithm identifier produced an error message "NotSupportedError: None of the algorithms specified in 'pubKeyCredParams' are supported by this device." on an Android® smartphone, and another error message "NotAllowedError: Operation failed." on an iPhone®. In some embodiments, probe 24 is configured to cause multiple errors and to determine a composite fingerprint feature comprising a concatenation of the individual error messages produced by the browser in response to each error.

Figure 11:
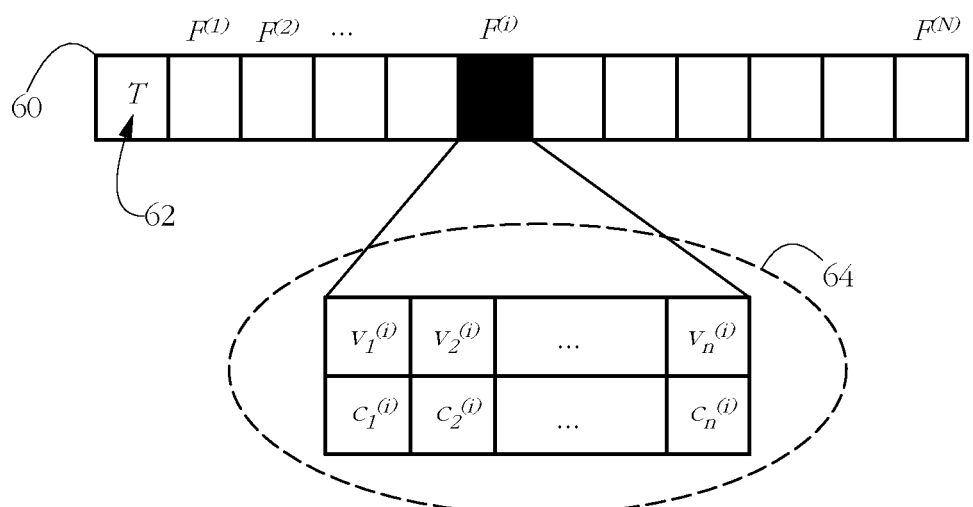
FIG. 11 shows an exemplary device fingerprint according to some embodiments of the present invention.

In some embodiments, in a step 242 (FIG. 4) fingerprinting module 20 may construct a device fingerprint according to locally extracted features (step 238) and further according to fingerprint data 26 received from client device 12 (step 240). An exemplary device fingerprint 60 according to some embodiments of the present invention is illustrated in FIG. 11. Fingerprint 60 comprises a data structure including a timestamp 62 and multiple feature fields 64. Timestamp 62 is indicative of a moment in time when the respective fingerprint was evaluated. In some embodiments, each feature field 64 corresponds to a distinct device feature $F^{(i)}$, i=1, . . . . N, wherein N denotes a total number of features used in characterizing the respective device. Features $F^{(i)}$ include features of access request 22 (e.g., features extracted from TLS ClientHello packets, TCP headers, and HTTP headers) as well as client browser features determined by fingerprinting code included in probe 24 (e.g., BOM features).

Some feature fields 64 include multiple feature values $v_j^{(i)}$ comprising distinct values of a respective feature $F^{(i)}$ observed during a fingerprinting procedure. As noted above, a single access request 22 may be broken in multiple individual packets due to network optimization and/or routing protocols, as well as due to encryption. Furthermore, some devices may transmit multiple access requests, for instance concurrent access requests to distinct services and/or locations. Fingerprinting module 20 may thus observe multiple values $v_j^{(i)}$ of the same feature $F^{(i)}$ during a single fingerprinting session. In one example, two consecutive packets may differ in the contents of the Options field of their TCP header. Some embodiments may then record two distinct values $v_1$ and $v_2$ for the respective TCP header feature. Feature values $v_j^{(i)}$ may be strings, numbers, or more complex data objects, depending on a type of the respective feature $F^{(i)}$. In some embodiments, feature field 64 may further include a count $c_j^{(i)}$ representing a number of times a respective feature value $v_j^{(i)}$ was encountered during the respective fingerprinting procedure/session.

Figure 12:
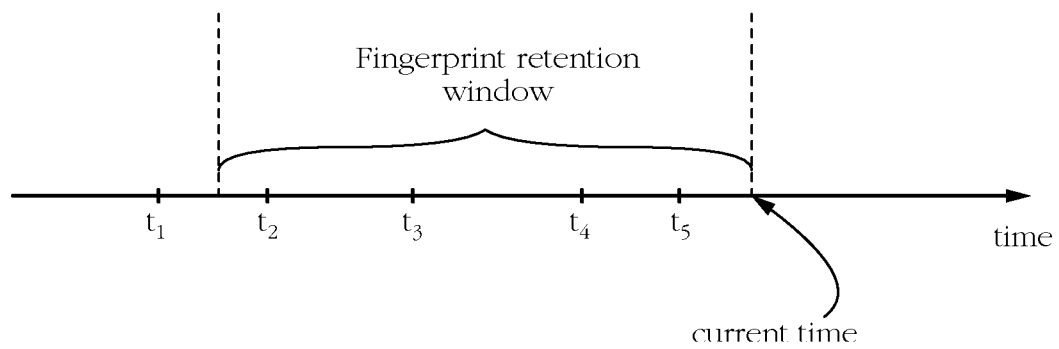
FIG. 12 illustrates an exemplary fingerprint retention window according to some embodiments of the present invention.
Figure 13:
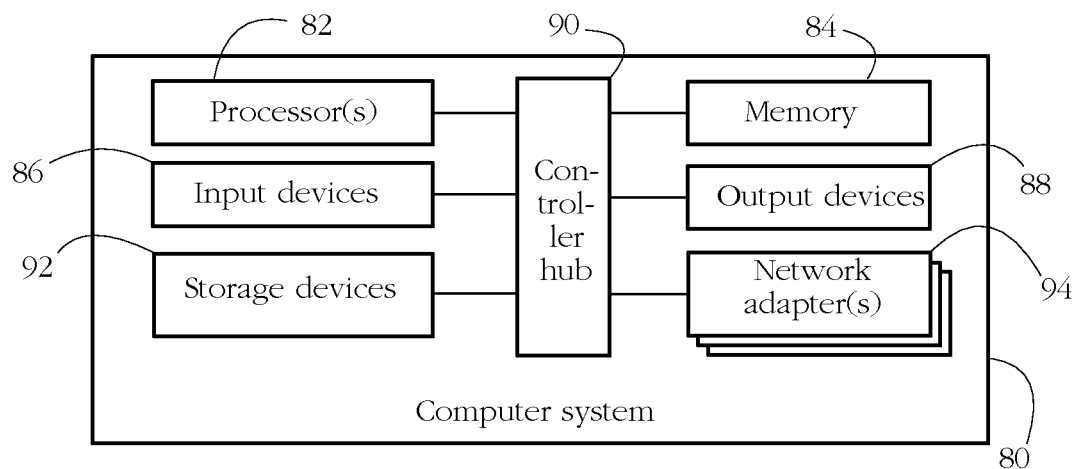
FIG. 13 shows an exemplary hardware configuration of a computer system programmed to execute some of the methods described herein.

In some embodiments, fingerprinting module 20 maintains a fingerprint database 44 associating client devices with device fingerprints. For instance, database 44 may comprise a set of records, each distinct record comprising an identifier of a client device and a set of device fingerprints calculated for the respective device. Exemplary device identifiers were described above in relation with client access database 42 in FIG. 1. In some embodiments, database 44 keeps a plurality of device fingerprints calculated for a respective device, each fingerprint calculated at a distinct moment in time. Some embodiments leverage a moving fingerprint retention window as illustrated in FIG. 12, wherein fingerprints older than a pre-determined maximum age are progressively discarded from database 42 or no longer used in fingerprint similarity calculations as described below.

In a sequence of steps 248-250, fingerprinting module 20 may proceed to determine whether the device fingerprint determined in step 242 (herein deemed target fingerprint) is similar to a previously determined device fingerprint. As such, step 242 may comprise selecting a record from database 44 and a reference fingerprint associated with the selected record, and determining a similarity measure quantifying a degree of similarity between the target fingerprint and the reference fingerprint.

One exemplary similarity measure is determined according to:

$$S = \frac{1}{N}\left[\sum_i \left(1 - \frac{|U^{(i)}\setminus V^{(i)}| + |V^{(i)}\setminus U^{(i)}|}{|U^{(i)} \cup V^{(i)}|}\right)\right], \quad [1]$$

wherein i indexes the device features, N denotes the count of distinct features i, $U^{(i)}$ denotes the set of all observed values $u_j^{(i)}$ of feature $F^{(i)}$ in the reference fingerprint, $V^{(i)}$ denotes the set of all observed values $v_j^{(i)}$ of feature $F^{(i)}$ in the target fingerprint (see e.g. FIG. 11 and associated description above), U denotes set union, \ denotes set difference, and |·| denotes cardinality (count of elements of a respective set). Intuitively, equation [1] estimates how many values of a device feature appear in either the target fingerprint or in the reference fingerprint (but not in both), and averages the respective estimate over the set of features and the count of fingerprints within the fingerprint retention window. S is relatively large (close to 1) when sets $U^{(i)}$ and $V^{(i)}$ contain essentially the same values, and relatively small (close to 0) when sets $U^{(i)}$ and $V^{(i)}$ differ substantially.

An alternative similarity measure may be determined according to:

$$S = \frac{1}{N}\left[\sum_i \left(1 - \frac{\sum_{w \in W^{(i)}} |\text{count}[w, U^{(i)}] - \text{count}[w, V^{(i)}]|}{\sum_{w \in W^{(i)}} (\text{count}[w, U^{(i)}] + \text{count}[w, V^{(i)}])}\right)\right], \quad [2]$$

wherein i indexes the device features, N denotes the count of distinct features i, $W^{(i)}$ denotes the union of sets $U^{(i)}$ and $V^{(i)}$, count [w, $U^{(i)}$] counts how many times value w of feature $F^{(i)}$ was observed in the reference fingerprint, and count [w, $V^{(i)}$] counts how many times value w of feature $F^{(i)}$ was observed in the target fingerprint. Intuitively, a similarity measure determined according to equation [2] is relatively large (close to 1) when the same value w was observed approximately the same number of times in both the reference and target fingerprints, and relatively small (close to 0) otherwise.

Some embodiments further average the similarity values over a fingerprint retention window, i.e., over multiple reference fingerprints evaluated for the same selected device at different times in the recent past:

$$\langle S \rangle = \frac{1}{|T|} \sum_T \alpha(T) \cdot S(T), \qquad [3]$$

wherein T indexes the distinct reference fingerprints within the retention window. A set of numerical weights a(T) so that $\Sigma_T a(T)=1$ may be used to emphasize the importance of recent with respect to older reference fingerprints.

In some embodiments, step 250 (FIG. 4) comprises comparing the determined similarity measure S to a pre-determined threshold and concluding whether the device currently undergoing fingerprinting is familiar according to a result of the comparison. For instance, some embodiments may determine that the currently fingerprinted device is familiar when S exceeds the threshold. Threshold values may be determined by experimentation; some exemplary S values determined for real devices are given further below.

When the tested device is deemed familiar (step 250 returns a YES), in a step 252 module 20 may update an existing database record for the respective device by adding the currently determined fingerprint to the respective record. Step 252 may therefore include determining an identity of the device currently being fingerprinted according to the determined similarity measures. For instance, in response to determining that the similarity between a target fingerprint and a reference fingerprint exceeds a threshold, some embodiments may determine that the device currently being fingerprinted is in fact the same as the device characterized by the reference fingerprint. Some embodiments may therefore identify the current device using the same device identifier associated with the reference fingerprint.

When step 250 returns a NO, indicating that no reference device has a fingerprint sufficiently similar to the target fingerprint, some embodiments conclude that the device currently being identified is an unfamiliar/previously unseen device. Therefore, a step 254 may create a new record for the respective device and insert the newly created record in fingerprint database 44. Creating a new database record may comprise computing a device identifier for the respective device and associating the new device identifier with the target fingerprint.

In a further step 256, fingerprinting module 20 may transmit an identification report 26 to network appliance 14 (see FIG. 3). In some embodiments, report 26 includes a device identifier of the respective client device, i.e., either an identifier of a familiar device or a new identifier calculated in step 254. Identification report 26 may further include a device fingerprint recently determined for the respective device.

FIG. 12 shows an exemplary hardware configuration of a computer system 80 programmed to execute some of the methods described herein. Computer system 80 generically represents any client device 12a-d in FIG. 1, as well as fingerprinting server 40 and network appliance 14. The illustrated device is a personal computer; other devices such as servers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 comprise specialized hardware that enable computer system 80 to connect to an electronic communication network (e.g., network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable an efficient device identification for applications such as access control and targeted content distribution, among others.

In an exemplary use case scenario, a network appliance (e.g., router) provides an access control service for a collection of electronic devices belonging to a household. The respective router may for instance enforce a parental control policy by not allowing a particular smartphone commonly used by a child to access a particular category of online content (e.g., adult content, gambling sites, etc.). However, the respective smartphone occasionally leaves the house and therefore disconnects from the local network. When the device returns, in order to avoid annoying network re-configuration procedures, the router must automatically recognize it to apply the correct access policy.

Such automatic recognition is hindered by several factors, such as an increasing use of privacy-enhancing strategies like MAC address randomization, wherein a device may expose a different MAC address to the network regulator on separate attempts to join a network. Stated otherwise, the MAC address is increasingly becoming an unreliable device identifier. Another factor complicating device identification is that modern electronic devices are frequently undergoing software updates and installing new software, which effectively changes their behavior in subtle ways. Even updates of non-essential software, such as a web browser, may change the way a device communicates with the outside world.

Some conventional device identification methods divide devices into a pre-determined set of relatively broad categories, for instance according to a device type and type of operating system. One such exemplary method may determine that the smartphone in the example above is a Samsung® Galaxy® S21 running Android® version 13. However, such methods may not be able to distinguish between two identical smartphones, one used by the respective child, the other used by her mother.

Some more sophisticated methods identify a device according to a communication received from the respective device. One such example analyzes a 'User-Agent' field of an HTTP request issued by the respective device. However, the content of the respective field may change when the browser undergoes an update, so the respective device will no longer look familiar.

Some embodiments of the present invention directly address such technical problems by determining a device fingerprint of a target device and determining whether the target device is the same as a familiar reference device by comparing the device fingerprint to a reference fingerprint determined for the reference device. Stated otherwise, some embodiments identify a device by comparing it to a known device and determining whether the two devices the same or not.

Device fingerprints computed as disclosed herein comprise multiple (approximately 10 to 100) distinct device features, combining features extracted from an intercepted access request issued by the respective device with features extracted by a fingerprinting probe (e.g., captive portal) executing on the respective device.

Exemplary features extracted from the access request include features determined according to a content of a TLS "Client Hello" handshake message, a content of a TCP header, and/or a content of an HTTP header of an intercepted data package. Some embodiments preferentially extract features from an 'Extensions' field of the HTTP header and/or an 'Options' field of a TCP header, relying on the observation that such fields are not standardized and therefore may vary substantially between different device types, operating systems, and browser models, allowing a reliable device identification.

Other exemplary set of fingerprint features characterize a browser executing on the respective device. Such features are extracted by code (e.g., JavaScript®) included in the fingerprinting probe/captive portal. Examples include a content of a browser object model (BOM) of the respective browser, relying on the observation that the BOM is not standardized, hence its content and structure varies substantially among different browser makes and versions.

By combining a relatively broad variety of device features into one fingerprint, some embodiments achieve a reliable device identification that especially addresses the issue of software updates. In some embodiments, different parts of the device fingerprint are sensitive to different kinds of updates. For instance, updates to the browser software or installation of new applications are likely to affect features of the BOM and HTTP headers, but less likely to affect TCP header metadata. Conversely, OS updates may effect changes to the network stack and thus to features extracted from TCP headers, while leaving BOM features unchanged. Therefore, in contrast to conventional methods that use a minimal set of features, in some embodiments of the present invention a single software update is relatively unlikely to change a device fingerprint to a degree that leads to misidentification. Meanwhile, the type of features included in the device fingerprints enable efficiently distinguishing a device from others.

Some of the device identification procedures described herein may further apply to computer security, for instance in combating hacking. One exemplary intrusion method comprises spoofing, wherein a rogue device masquerades as a legitimate one (for instance by using its MAC address) in order to gain access to a target network and/or resources. An access control system implementing device fingerprinting according to some embodiment of the present invention will likely detect an intruding device, because its device fingerprint includes substantially more than the MAC address and therefore is likely to differ greatly from that of the legitimate device. Furthermore, the type of device features included in the fingerprint are rather difficult to forge without a profound knowledge of the imitated device.

To illustrate some of the methods described herein, a series of computer experiments were carried out on a collection of test devices consisting of mobile telephones of various makes and models. Device 1 is a Huawei® P smart Z running Android® 10. Device 2 is a Google® Pixel® 5a with Android® 13. Device 3 is a Google® Pixel® 6 with Android 13. Device 4 is a Samsung® Galaxy® S22 with Android® 13. Devices 5 and 6 were identical instances of Apple® iPhone® running iOS® 16.6.

The device fingerprints comprise features extracted from TCP headers, features extracted from TLS handshakes, HTTP headers, BOM strings, set of available fonts, date formatting, as well as properties of the 'window', 'navigator', and 'screen' nodes of the BOM. The test devices were fingerprinted repeatedly over an extended period, during which some devices received various kinds of updates, while others didn't.

Tables 1 and 2 show device similarity measures calculated for the test devices using a version of Eqn. [1] and [2], respectively.

TABLE 1

|  | Device 1 | Device 2 | Device 3 | Device 4 | Device 5 | Device 6 |
| --- | --- | --- | --- | --- | --- | --- |
| Device 1 | 0.986 | 0.283 | 0.433 | 0.663 | 0 | 0 |
| Device 2 | 0.283 | 0.842 | 0.390 | 0.528 | 0 | 0 |
| Device 3 | 0.433 | 0.390 | 0.990 | 0.417 | 0 | 0 |
| Device 4 | 0.663 | 0.528 | 0.417 | 0.977 | 0 | 0 |
| Device 5 | 0 | 0 | 0 | 0 | 1.000 | 0.880 |
| Device 6 | 0 | 0 | 0 | 0 | 0.880 | 0.844 |

TABLE 2

|          | Device 1 | Device 2 | Device 3 | Device 4 | Device 5 | Device 6 |
|----------|----------|----------|----------|----------|----------|----------|
| Device 1 | 0.965    | 0.497    | 0.350    | 0.782    | 0        | 0        |
| Device 2 | 0.497    | 0.677    | 0.238    | 0.516    | 0        | 0        |
| Device 3 | 0.350    | 0.238    | 0.856    | 0.343    | 0        | 0        |
| Device 4 | 0.782    | 0.516    | 0.343    | 0.960    | 0        | 0        |
| Device 5 | 0        | 0        | 0        | 0        | 0.959    | 0.857    |
| Device 6 | 0        | 0        | 0        | 0        | 0.857    | 0.834    |

The test results above show that both manners of evaluating device similarity are qualitatively similar, in that the self-similarity measure (i.e., similarity between distinct fingerprints determined for the same device) is generally substantially larger than inter-device similarity. This shows that the methodology described herein may be used reliably for device identification, and especially for distinguishing between iOS® and Android® devices.

The observed self-similarity measures are not exactly equal to 1.0, as could be expected when comparing a device with itself. The slight departures from 1.0 are likely due to differences in network parameters (e.g., congestion, etc.) between the two respective fingerprinting sessions, as well as to changes in various features of the respective device during the time elapsed since the latest fingerprinting. The most significant changes occurred in devices 2 and 6, which underwent an operating system upgrade just prior to the latest fingerprint evaluation. Remarkably, even such a fundamental change that is likely to affect both the network stack software and browser features did not cause the self-similarity measure determined for the respective devices to drop below 0.8. This observation illustrates the advantages of using a substantial number of device features, including features extracted from the access request and features characterizing the browser, since using a higher number of features and more diverse feature set is likely to lessen the impact of an update.

A slight anomaly was observed with devices 5 and 6, wherein the self-similarity of device 6 came out smaller than the similarity between devices 5 and 6. Such a situation may lead to network appliance 14 mistaking device 6 for device 5 and hence applying the wrong access policy. However, the observed situation is likely to be accidental and temporary. Device 6 was fingerprinted again following the operating system update, and as a result the self-similarity rose from 0.844 to 1.0, while the cross similarity between devices 5 and 6 dropped from 0.880 to 0.770, enabling a correct identification of the respective device.

To further illustrate the advantages of using a relatively large and diverse set of device features in calculating the device fingerprint, Table 3 shows a similarity measure calculated using the same fingerprinting instances as those used in Tables 1 and 2, but using only device features extracted by fingerprinting probe 24 (e.g., captive portal methods):

TABLE 3

|          | Device 1 | Device 2 | Device 3 | Device 4 | Device 5 | Device 6 |
|----------|----------|----------|----------|----------|----------|----------|
| Device 1 | 0.960    | 0.090    | 0.300    | 0.400    | 0        | 0        |
| Device 2 | 0.090    | 0.526    | 0.171    | 0.085    | 0        | 0        |
| Device 3 | 0.300    | 0.171    | 0.972    | 0.251    | 0        | 0        |
| Device 4 | 0.782    | 0.085    | 0.251    | 0.933    | 0        | 0        |
| Device 5 | 0        | 0        | 0        | 0        | 1.000    | 0.660    |
| Device 6 | 0        | 0        | 0        | 0        | 0.660    | 0.600    |

The test results shown in Table 3 are qualitatively similar to those in Tables 1 and 2 in that the self-similarity scores are substantially higher that inter-device similarity scores, allowing a reliable device identification. This attests to the ability of some browser features such as BOM traversal strings and forced error messages to discern between devices. However, the observed variability of the self-similarity measures greatly exceeds the one displayed in Tables 1 and 2, which may lead to accidental misidentifications.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to:

in response to receiving an access request from a client device, transmit a fingerprinting probe to the client device, the fingerprinting probe comprising computer code configured to determine a first set of feature values characterizing a browser executing on the client device, wherein the first set of values comprises a set of properties of a selected node of a browser object model (BOM), the BOM comprising a hierarchical representation of a set of software objects exposed by the browser;

receive the first set of feature values from the client device;

determine a second set of feature values characterizing the client device according to metadata of the access request;

determine a device fingerprint of the client device according to the first and second set of feature values;

determine a similarity measure quantifying a similarity between the device fingerprint and a reference fingerprint characterizing a reference device; and in response, if the similarity measure indicates that the client device is the same as the reference device, set a device identifier of the client device to be equal to a device identifier of the reference device.

2. The computer system of claim 1, wherein the access request comprises a request to access a remote resource, and wherein the at least one hardware processor is further configured, in response to determining the device identifier, to transmit the device identifier of the client device to a network appliance configured to control access of the client device to the remote resource according to the device identifier.

3. The computer system of claim 1, wherein the first set of feature values comprises an ordered list of node names comprising names of all nodes of a selected subtree of the BOM, the selected subtree including the selected node.

4. The computer system of claim 1, wherein the selected node includes a navigator node or a screen node of the BOM.

5. The computer system of claim 1, wherein the computer code is configured to deliberately cause an error of the browser, and to determine the first set of features according to a content of an error message produced by the browser in response to the error.

6. The computer system of claim 1, wherein determining the second set of feature values comprises:
determining whether the access request comprises a transport layer security (TLS) handshake message; and
in response, if yes, determining the second set of feature values according to a content of an extensions field of the TLS handshake message.

7. The computer system of claim 1, wherein determining the second set of feature values comprises:
selecting a packet comprising a part of the access request according to whether a SYN flag of a transmission control protocol (TCP) header of the packet is set; and
in response, determining the second set of feature values according to a content of an options field of the TCP header.

8. The computer system of claim 1, wherein:
the access request comprises a plurality of data packets; and
the at least one hardware processor is configured to determine the similarity measure according to a count of times a selected feature value of the second set of feature values occurs within the plurality of data packets.

9. The computer system of claim 1, wherein the at least one hardware processor is configured to determine the similarity measure according to:

$$|U \setminus V| + |V \setminus U|,$$

wherein V denotes the first or the second set of feature values, U denotes a third set of feature values characterizing the reference device, \ denotes set difference, and |·| denotes a count of elements of a respective set.

10. A computer-implemented method comprising employing at least one hardware processor of a computer system to:
in response to receiving an access request from a client device, transmit a fingerprinting probe to the client device, the fingerprinting probe comprising computer code configured to determine a first set of feature values characterizing a browser executing on the client device, wherein the first set of values includes a set of properties of a selected node of a browser object model (BOM), the BOM comprising a hierarchical representation of a set of software objects exposed by the browser;
receive the first set of feature values from the client device;
determine a second set of feature values characterizing the client device according to metadata of the access request;
determine a device fingerprint of the client device according to the first and second set of feature values;
determine a similarity measure quantifying a similarity between the device fingerprint and a reference fingerprint characterizing a reference device; and
in response, if the similarity measure indicates that the client device is the same as the reference device, set a device identifier of the client device to be equal to a device identifier of the reference device.

11. The method of claim 10, wherein the access request comprises a request to access a remote resource, the method further comprising, in response to determining the device identifier, transmitting the device identifier of the client device to a network appliance configured to control access of the client device to the remote resource according to the device identifier.

12. The method of claim 10, wherein the first set of feature values comprises an ordered list of node names comprising names of all nodes of a selected subtree of the BOM, the selected subtree including the selected node.

13. The method of claim 10, wherein the selected node includes a navigator node or a screen node of the BOM.

14. The method of claim 10, wherein the computer code is configured to deliberately cause an error of the browser, and to determine the first set of features according to a content of an error message produced by the browser in response to the error.

15. The method of claim 10, wherein determining the second set of feature values comprises employing the at least one hardware processor to:
determine whether the access request comprises a transport layer security (TLS) handshake message; and
in response, if yes, determine the second set of feature values according to a content of an extensions field of the TLS handshake message.

16. The method of claim 10, wherein determining the second set of feature values comprises employing the at least one hardware processor to:
select a packet comprising a part of the access request according to whether a SYN flag of a transmission control protocol (TCP) header of the packet is set; and
in response, determine the second set of feature values according to a content of an 'Options' options field of the TCP header.

17. The method of claim 10, wherein:
the access request comprises a plurality of data packets; and
the method comprises determining the similarity measure according to a count of times a selected feature value of the second set of feature values occurs within the plurality of data packets.

18. The method of claim 10, comprising determining the similarity measure according to:

$$|U \setminus V| + |V \setminus U|,$$

wherein V denotes the first or the second set of feature values, U denotes a third set of feature values characterizing the reference device, \ denotes set difference, and |·| denotes a count of elements of a respective set.

19. A non-transitory computer-readable medium storing instructions which, when executed by at least one hardware processor of a computer system, cause the computer system to:
in response to receiving an access request from a client device, transmit a fingerprinting probe to the client device, the fingerprinting probe comprising computer code configured to determine a first set of feature values characterizing a browser executing on the client device, wherein the first set of values comprises a set of properties of a selected node of a browser object model (BOM), the BOM comprising a hierarchical representation of a set of software objects exposed by the browser;

receive the first set of feature values from the client device;

determine a second set of feature values characterizing the client device according to metadata of the access request;

determine a device fingerprint of the client device according to the first and second set of feature values;

determine a similarity measure quantifying a similarity between the device fingerprint and a reference fingerprint characterizing a reference device; and in response, if the similarity measure indicates that the client device is the same as the reference device, set a device identifier of the client device to be equal to a device identifier of the reference device.

* * * * *